United States Patent
Lapstun et al.

(10) Patent No.: US 7,557,948 B2
(45) Date of Patent: *Jul. 7, 2009

(54) DOCUMENT COPIER WITH A CONTROLLER FOR DECODING OPTICAL PATTERNS ON SHEETS OF MEDIA

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/170,405

(22) Filed: Jul. 9, 2008

(65) Prior Publication Data

US 2008/0267645 A1 Oct. 30, 2008

Related U.S. Application Data

(63) Continuation of application No. 11/250,465, filed on Oct. 17, 2005, now Pat. No. 7,414,741, which is a continuation of application No. 09/721,858, filed on Nov. 25, 2000, now Pat. No. 6,980,306.

(51) Int. Cl.
*G06F 15/00* (2006.01)
*G06G 15/22* (2006.01)

(52) U.S. Cl. ..................... 358/1.15; 399/306
(58) Field of Classification Search ............... 358/1.16, 358/1.9, 1.12, 474; 399/306, 15, 83, 223, 399/364; 235/375, 432, 545; 270/1.01, 52.02
See application file for complete search history.

(56) References Cited

U.S. PATENT DOCUMENTS

| | | |
|---|---|---|
| 4,864,618 A | 9/1989 | Wright et al. |
| 5,051,736 A | 9/1991 | Bennett et al. |
| 5,243,381 A * | 9/1993 | Hube ........................ 399/84 |
| 5,477,012 A | 12/1995 | Sekendur |
| 5,488,458 A | 1/1996 | Benedict et al. |

(Continued)

FOREIGN PATENT DOCUMENTS

DE 19539930 5/1996

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner*—Saeid Ebrahimi Dehkordy (57) ABSTRACT

Provided is a document copier having an input transport mechanism and an output transport mechanism linked via a media path, the mechanisms configured to feed sheets of media through the media path. Also included is a print engine located in the media path for printing on media fed through the media path, and a code sensor arranged before the print engine in the media path, said sensor configured to capture images of a sheet surface. The copier also includes a controller for controlling the transport mechanisms, the print engine and code sensor. The controller decodes optical patterns found in the captured images to obtain one or more codes able to identify an electronic source where an electronic copy of the sheet is stored, and to print the electronic copy on a blank sheet of media with the print engine.

7 Claims, 4 Drawing Sheets

U.S. PATENT DOCUMENTS

| | | |
|---|---|---|
| 5,652,412 A | 7/1997 | Lazzouni et al. |
| 5,655,759 A | 8/1997 | Perkins et al. |
| 5,661,506 A | 8/1997 | Lazzouni et al. |
| 5,692,073 A | 11/1997 | Cass |
| 5,754,434 A | 5/1998 | Delfer et al. |
| 5,848,325 A | 12/1998 | Matsumura et al. |
| 5,852,434 A | 12/1998 | Sekendur |
| 6,076,734 A | 6/2000 | Dougherty et al. |
| 6,415,983 B1 | 7/2002 | Ulvr et al. |
| 6,466,329 B1 | 10/2002 | Mukai |
| 6,775,381 B1 | 8/2004 | Nelson et al. |
| 6,964,374 B1 | 11/2005 | Djuknic et al. |
| 7,414,741 B2 * | 8/2008 | Lapstun et al. .............. 358/1.12 |

FOREIGN PATENT DOCUMENTS

| | | |
|---|---|---|
| EP | 0597784 A | 5/1994 |
| EP | 0606131 A | 7/1994 |
| EP | 0359541 | 12/1994 |
| EP | 0710003 A | 5/1996 |
| EP | 0833276 A | 4/1998 |
| GB | 2306669 A | 5/1997 |
| JP | 07-112562 | 5/1995 |
| JP | 09-219765 | 8/1997 |
| JP | 10285378 | 10/1998 |
| SE | 8703591 | 3/1989 |
| WO | WO 91/02654 | 3/1991 |
| WO | WO 99/18487 A2 | 4/1999 |
| WO | WO 99/50787 A1 | 10/1999 |

* cited by examiner

DOCUMENT COPIER WITH A CONTROLLER FOR DECODING OPTICAL PATTERNS ON SHEETS OF MEDIA

CROSS-REFERENCE TO RELATED APPLICATIONS

This is a Continuation application of U.S. Ser. No. 11/250,465, filed on Oct. 17, 2005, now issued U.S. Pat. No. 7,414,741 which is a Continuation application of U.S. Ser. No. 09/721,858, filed on Nov. 25, 2000, now issued U.S. Pat. No. 6,980,306, all of which are herein incorporated by reference.

FIELD OF INVENTION

The present invention relates to printing documents and, more particularly, is directed toward a printer which prints collated multi-page documents from a plurality of manually collated pages.

CO-PENDING APPLICATIONS

Various methods, systems and apparatus relating to the present invention are disclosed in the following co-pending applications/granted patents filed by the applicant or assignee of the present invention simultaneously with the present invention:

| | | | |
|---|---|---|---|
| 6,530,339 | 6,631,897 | 09/721,895 | 09/722,174 |
| 7,175,079 | 7,064,851 | 6,826,547 | 6,741,871 |
| 6,927,871 | 6,980,306 | 6,965,439 | 6,788,982 |
| 09/722,141 | 6,788,293 | 6,946,672 | 7,091,960 |
| 6,792,165 | 7,105,753 | 7,182,247 | |

The disclosures of these co-pending applications are incorporated herein by cross-reference.

Various methods, systems and apparatus relating to the present invention are disclosed in the following co-pending applications/granted patents filed by the applicant or assignee of the present invention on Oct. 20, 2000:

| | | | |
|---|---|---|---|
| 7,190,474 | 7,110,126 | 6,813,558 | 6,965,454 |
| 6,847,883 | 7,131,058 | 09/693,690 | 6,474,888 |
| 6,627,870 | 6,724,374 | 09/693,514 | 6,454,482 |
| 6,808,330 | 6,527,365 | 6,474,773 | 6,550,997 |

The disclosures of these co-pending applications are incorporated herein by cross-reference.

Various methods, systems and apparatus relating to the present invention are disclosed in the following co-pending applications/granted patents filed by the applicant or assignee of the present invention on Sep. 15, 2000:

| | | | |
|---|---|---|---|
| 6,679,420 | 6,963,845 | 6,995,859 | 6,720,985 |

The disclosures of these co-pending applications are incorporated herein by cross-reference.

Various methods, systems and apparatus relating to the present invention are disclosed in the following co-pending applications/granted patents filed by the applicant or assignee of the present invention on Jun. 30, 2000:

| | | | |
|---|---|---|---|
| 6,824,044 | 6,678,499 | 6,976,220 | 6,976,035 |
| 6,766,942 | 09/609,303 | 6,922,779 | 6,978,019 |
| 09/607,843 | 6,959,298 | 6,973,450 | 7,150,404 |
| 6,965,882 | 7,233,924 | 6,957,921 | 6,457,883 |
| 6,831,682 | 6,977,751 | 6,398,332 | 6,394,573 |
| 6,622,923 | | | |

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:

| | | | |
|---|---|---|---|
| 6,428,133 | 6,526,658 | 6,338,548 | 6,540,319 |
| 6,328,431 | 6,328,425 | 6,991,320 | 6,383,833 |
| 6,464,332 | 6,390,591 | 7,018,016 | 6,328,417 |
| 09/575,197 | 7,079,712 | 6,825,945 | 09/575,165 |
| 6,813,039 | 6,987,506 | 7,038,797 | 6,980,318 |
| 6,816,274 | 7,102,772 | 09/575,186 | 6,681,045 |
| 6,728,000 | 7,173,722 | 7,088,459 | 09/575,181 |
| 7,068,382 | 7,062,651 | 6,789,194 | 6,789,191 |
| 6,644,642 | 6,502,614 | 6,622,999 | 6,669,385 |
| 6,549,935 | 6,987,573 | 6,727,996 | 6,591,884 |
| 6,439,706 | 6,760,119 | 09/575,198 | 6,290,349 |
| 6,428,155 | 6,785,016 | 6,870,966 | 6,822,639 |
| 6,737,591 | 7,055,739 | 7,233,320 | 6,830,196 |
| 6,832,717 | 6,957,768 | 09/575,172 | 7,170,499 |
| 7,106,888 | 7,123,239 | 6,409,323 | 6,281,912 |
| 6,604,810 | 6,318,920 | 6,488,422 | 6,795,215 |
| 7,154,638 | 6,859,289 | | |

The disclosures of these co-pending applications are incorporated herein by cross-reference.

BACKGROUND

Multi-page documents often include content created using a diversity of desktop applications including word processing, drawing, graphing and spreadsheet tools. Because of operating system and middleware complexity, many users are unable to integrate diverse content into a single presentation document. In many cases, a single presentation document combines content created by different users, all of whom may have particular application skills, but none of whom may have content integration skills. Because of this users often resort to manual collation.

The problem becomes particularly apparent when multiple copies of a multiple page collated document are required. If it is difficult or impossible for the user to print out the pages in the desired, collated order, then the user typically has to finish the process by manually collating each individual multi-page document copy. The degree of complexity in this process depends on the number of pages in each copy and the number of copies printed.

If the printed multi-page documents are to be bound, the necessity of manual collation prevents full automation of the process, as proper collation must occur before the binding step.

SUMMARY OF INVENTION

It is an object of the present invention to provide a new printer for and method of printing collated documents.

The present invention provides, in a first aspect, a printer for printing a collated multi-page document when presented with a plurality of manually collated pages, the printer including:

(a) a code sensor which senses machine-readable codes on the manually collated pages;
(b) a control unit which uses the machine-readable codes to identify and retrieve previously stored electronic versions of the pages; and
(c) a print engine which prints the retrieved pages.

Preferably the printer includes a binder for binding together the printed pages, and a scanner for copying pages which do not have machine-readable codes on them and which produces electronic versions of the pages.

Preferably also the printer includes a storage medium which stores the electronic versions of the scanned pages, and a hand-held code sensor which senses machine-readable codes on the manually collated pages wherein the machine-readable codes on the manually collated pages are represented:

(a) optically; or
(b) electronically; or
(c) magnetically; or
(d) topographically; or
(e) chemically.

Preferably the code sensor senses machine-readable codes on both sides of the manually collated pages, and the control unit also controls communications between the printer and one or more peripheral devices. Preferably electronic versions of the manually collated pages which are to be printed are retrieved from at least one of the group including:

(a) a storage medium contained within a host computer;
(b) a server which is accessed over a computer network;
(c) a storage medium contained within the printer itself; or
(d) any combination of the above.

Preferably the printer includes an input device with which a user of the printer controls the format of the printed and collated multi-page document, wherein the input device includes a touch sensitive display, and wherein the print engine also prints Machine-readable codes onto a page, and wherein the machine-readable codes are not visible to human vision. Preferably also the printer inserts blank pages in the printed document to duplicate blank pages contained within the manually collated pages. Preferably instructions from a hand-held code sensor are received and interpreted, and a collated multi-page document is produced.

Preferably the printer includes an interface which transmits instructions for printing a collated multi-page document to a second printer, wherein the instructions are transmitted over a computer network or over a telephone network. Also preferably the printer includes a storage medium which stores an electronic version of pages which have been printed.

In a second aspect, the invention provides a method of printing a collated multi-page document when presented with a plurality of manually collated pages, the method including the following steps:

(a) sensing machine-readable codes on the manually collated pages using a code sensor;
(b) using the machine-readable codes to identify and retrieve previously stored electronic versions of the pages; and
(c) printing the retrieved pages.

Preferably the invention provides a method including the step of binding together the printed pages, and further including the steps of using a scanner for copying pages which do not have machine-readable codes on them and producing electronic versions of those pages. Preferably also the step of printing the retrieved pages includes printing machine-readable codes on those pages, and wherein the machine-readable codes are invisible.

Preferably the code sensor senses machine-readable codes on both sides of the manually collated pages.

Preferably the method includes the step of using an input device to control the format of the printed and collated multi-page document, and wherein the printing step includes the sub-step of transmitting the retrieved pages to a remote printer.

The invention will now be described in greater detail by reference to the attached drawings. It is to be understood that the particularity of the embodiments illustrated in the drawings does not supersede the generality of the foregoing description of the invention.

BRIEF DESCRIPTION OF DRAWINGS

Preferred and other embodiments of the invention will now be described, by way of non-limiting example only, with reference to the accompanying drawings, in which.

DETAILED DESCRIPTION OF PREFERRED AND OTHER EMBODIMENTS

A page can be printed with one or more machine-readable codes which identify an electronic version of the page stored in a computer system. This can allow the page to be used as a token for obtaining a pristine digital copy of the page, described further in our earlier application U.S. Ser. No. 09/693,219, obviating any need to physically scan and print (i.e. "photocopy") the page. It can also allow the page to be used in conjunction with a hand-held code-sensing device to capture user input in relation to the page, such as handwriting and hyperlink activations described further in our earlier application U.S. Ser. No. 09/722,142. The machine-readable codes are preferably unobtrusive and ideally invisible, e.g. printed using an ink which is machine-readable but invisible to the unaided human eye, such as an infrared-absorptive ink.

Various workgroup printers have been described which also act as "walk-up" document terminals, i.e. they provide a user interface which allows a document to be selected and printed without recourse to a workstation, and in particular, without recourse to a workstation with access to the original electronic version of the document. An example of such a workgroup printer is described further in our earlier application U.S. Ser. No. 09/505,003. Documents which may be selected and printed in this way are typically documents which have been previously printed via the printer, and in the process stored on the printer's internal hard disk. To optimize printing speed, the documents are typically stored in a raster-ized or partially-rasterized format. A user may have the option to "print" a document to the printer's hard disk, i.e. to make it available for walk-up printing without actually printing it.

A walk-up printer may utilize storage on a local-area or wide-area network rather than having its own internal storage, and a group of such printers may have access to a shared document repository. A walk-up printer may also simply record links to original documents rather than making copies.

A printer may include a binding mechanism for binding the pages of a document into a single whole. Various binding mechanisms suitable for inclusion in a high-speed workgroup printer are described further in our co-filed application U.S. Pat. No. 6,530,339.

Since a document must typically be sent to a printer as a single document to produce a bound copy, document integration is normally a prerequisite for binding. This presents a barrier to many users.

The present invention concerns a printer which can produce one or more bound documents when presented with a manually-collated bundle of pages. The printer contains a code sensor for sensing machine-readable codes on the pages, allowing it to identify and produce printed copies of the pages from electronic versions of the pages. The printer optionally contains a scanner for copying pages which are not coded.

The copying process may be used to produce double-sided output from single-sided input. Blank pages can be interspersed with the input to force the inclusion of blank pages.

Figure 1:
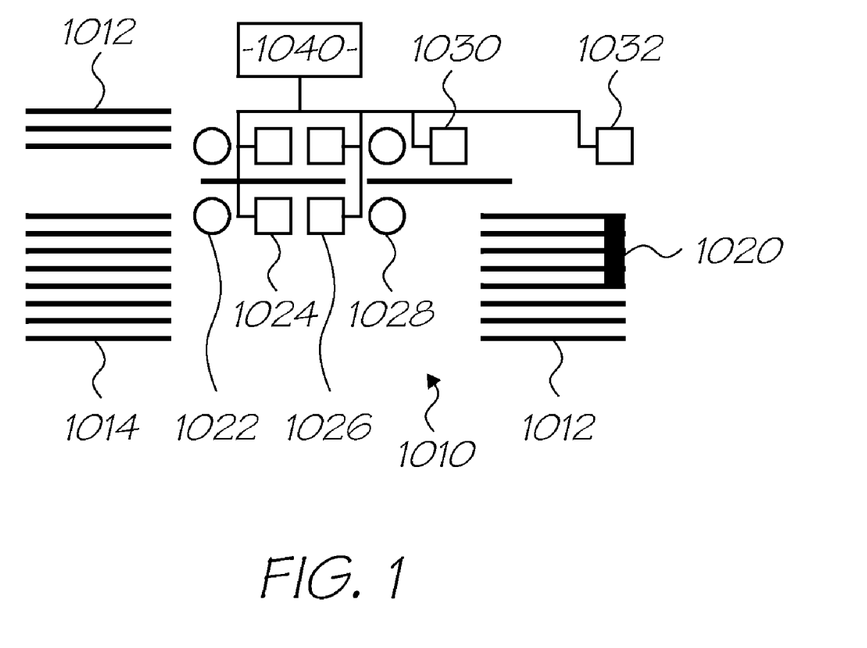
FIG. 1 illustrates a printer with electronic collator according to the preferred embodiment of the invention.

As illustrated in FIG. 1, the printer of the preferred embodiment has two input trays, one for source pages 1012, the other for sheets 1014 of an input medium such as paper. The paper path includes an input transport mechanism 1022, one or more code sensors 1024, one or more print engines 1026, an output transport mechanism 1028, and a binding mechanism 1030, 1032. A printer controller 1040 controls the printing process.

The printer has a single output tray in which it accumulates both decoded source pages 1012 and printed and bound documents 1020. As an alternative, the printer may have separate output trays for source pages and documents. It may, for example, deposit decoded source pages back in the source page input tray, typically separated from input source pages by a mechanical finger which prevents already-sensed source pages from being treated as further input.

The preferred binding mechanism, described further in our co-filed application U.S. Pat. No. 6,530,339, consists of a page-height adhesive applicator 1030, and a page-height stamper 1032. The adhesive applicator applies a strip of adhesive adjacent to the spine of a page just before the page enters the output bin. The stamper 1032 presses the pages in the output bin together, causing pages with adhesive strips to adhere to each other. Adhesive may be applied to either the front or the back of each page of a document. When it is applied to the front, it is not applied to the first page. When it is applied to the back, it is not applied to the last page. The stamper is typically operated after the last page of the document is printed, although if adhesive is applied to the front of each (face-down) page, then the stamper may be used after each page is printed or periodically during the printing of a document. Alternative binding mechanisms include corner or page-height stapling and clamping.

The preferred code sensor 1024, described further in our earlier application U.S. Ser. No. 09/722,142, consists of a light source, projection and image capture optics, and an image sensor. Codes are represented by optical patterns which are printed or otherwise applied to a surface, for example as described further in our earlier application U.S. Ser. No. 09/722,142. As a source page 1012 is transported past the code sensor 1024, the printer controller 1040 captures images of the page surface via the image sensor, decodes the optical patterns found in the images, and thereby obtains one or more codes which directly or indirectly identify the source page and/or a document of which the source page is part. Codes may alternatively be represented electronically, magnetically, topographically, or chemically, with correspondingly adapted code sensors.

Figure 2:
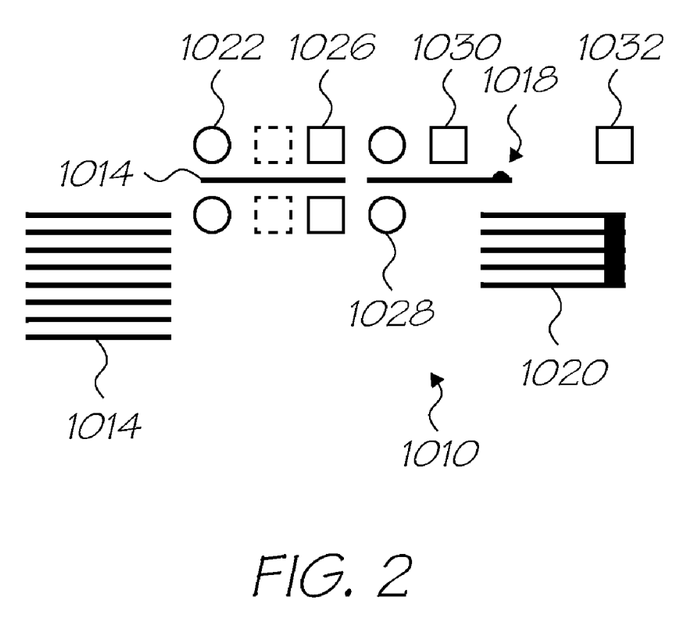
FIG. 2 illustrates the printing and binding path for an embodiment of the invention.

During printing, as illustrated in FIG. 2, the input transport mechanism 1022 picks up an input sheet 1014, the print engines 1026 print the page content onto one or both sides of the sheet, and the output transport mechanism 1028 deposits the sheet in the output tray. The adhesive applicator 1030 applies adhesive 1018 to one side of the sheet just before it is deposited in the output tray, and the stamper 1032 presses the several sheets of a document together in the output tray to form a bound document 1020.

Figure 3:
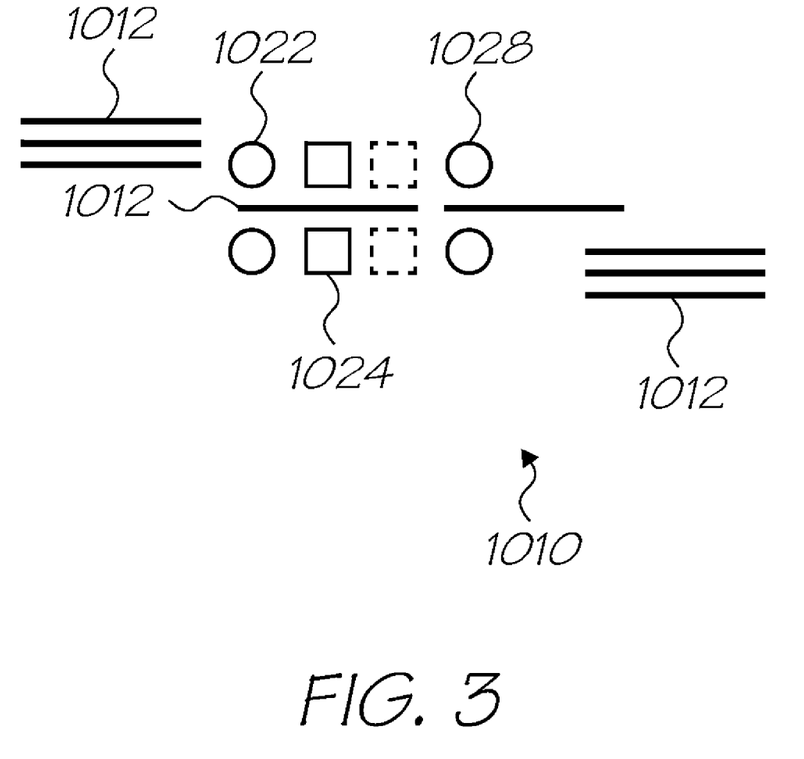
FIG. 3 illustrates the copying path for an embodiment of the invention.

During code sensing, as illustrated in FIG. 3, the input transport mechanism 1022 picks up a source page 1012, the processor senses codes from one or both sides of the source page via the code sensors 1024, and the output transport mechanism 1028 deposits the source page in the output tray. Copying consists of a code sensing phase followed by a printing phase. In the preferred arrangement, the code sensors are a fixed part of the apparatus. As an alternative to this arrangement, the code sensor may be embodied in a hand-held device, such as a suitably enabled pen or stylus, as described further in our earlier application U.S. Ser. No. 09/721,893, so that the user specifies how the printed document is collated by manually sensing a set of pages, in which case the printer need not necessarily include the code sensor 1024 in the paper path.

The printer is ideally enabled for printing codes which it can subsequently sense. This is not a requirement, however, and the printer may simply be used in conjunction with source pages printed by another printer.

The printer may also be enabled, described further in our earlier application U.S. Ser. No. 09/722,142, for receiving, interpreting and/or relaying transmissions from a hand-held code sensing device, such as a suitably enabled pen or stylus, as described further in our earlier application U.S. Ser. No. 09/721,893.

The printer has a user interface which minimally provides a "copy" button. The user inter-face may also include a color touch-sensitive display which allows a user to browse a list of documents accessible to the printer, and select a particular document for printing. The copy button may also be provided in virtual form on the display. When the user presses the copy button, the printer transports each source page in the input tray past the code sensors and records the corresponding page identity information. When all source pages have been processed, the printer uses the page identity information to retrieve electronic versions of the pages, and uses these electronic versions to print "copies" of the source pages, bound into a single document. The printer consults a locally- or network-stored index of documents and/or pages to identify and retrieve the electronic versions of the pages.

The user interface may allow the user to select or specify typical photocopying and printing options, including the number of copies, whether documents are bound, single-sided versus double-sided printing, scaling of page content, and media selection, including different media sizes.

Figure 4:
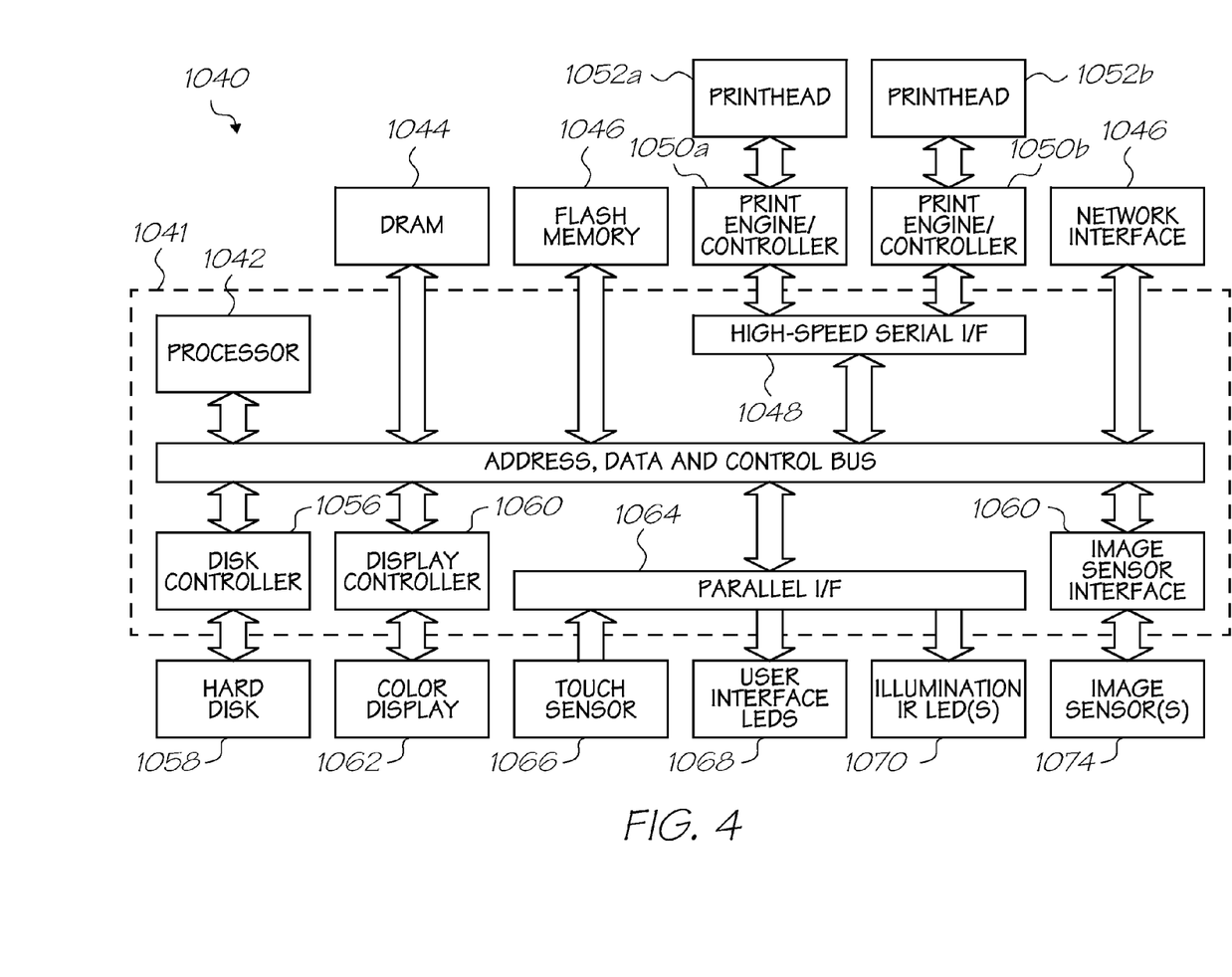
FIG. 4 is a block diagram of a printer controller according to an embodiment of the invention.

The printer controller 1040, a block diagram of which is shown in FIG. 4, handles communication with host computers, manages the user interface, and controls the printing process. It consists of an integrated controller chip 1041 and a number of separate components. The controller includes a processor 1042 which runs control software loaded into a DRAM 1044 from a flash memory 1046. The processor may also download control software from a host computer.

The printer controller communicates with host computers via a network interface 1046. The network interface may provide direct connection to a host computer, such as a serial, parallel (IEEE 1284), Universal Serial Bus (USB) or IEEE 1394 connection, or connection onto a local-area network, such as an Ethernet, or connection onto a wide-area net-work, such as the Internet. The controller may include multiple such network interfaces.

The printer controller may include a disk controller 1056 for controlling a hard disk 1058 internal to the printer. The printer controller may use the hard disk for storing queued print jobs, i.e. documents, rasterized or partially-rasterized pages, and an index of documents and pages. It may also utilize storage provided by computers accessible via its network interface for some or all of these purposes.

If the printer includes a touch-sensitive color display user interface, then the printer controller includes a display controller 1060 for controlling a color display 1062, and a touch sensor 1066 overlaid on the display for capturing user interactions with the displayed user interface. The color display is typically a TFT color LCD, but may be any suitable display device, including, for example, an organic LED (OLED) display. The printer controller captures input from the touch sensor 1066 via a parallel interface 1064.

The printer may include a number of user interface LEDs 1068 for indicating printer, paper and ink status information to users. The printer controller also controls these via the parallel interface 1064.

The printer controller includes one or more image sensor interfaces 1060 for controlling a corresponding number of image sensors 1074 used to capture images of code patterns appearing on source page surfaces. Each image sensor 1074 is typically a charge coupled device (CCD), but may be any suitable image sensor, including, for example, a CMOS image sensor. At least one illumination LED 1070 is typically associated with each image sensor. The printer controller also controls the illumination LEDs 1070 via the parallel interface 1064, although they may be more closely coupled with the relevant image sensor interface 1060 to allow them to be efficiently strobed in synchrony with image capture.

The printer typically includes one or two printheads 1052, depending on whether it has a duplex printing capability or not, although it may include additional printheads to achieve higher-speed printing or to support more complex ink sets.

The printer controller includes a high-speed serial interface 1048 for communicating with a pair of print engine/controllers 1050, each of which controls a printhead 1052. In the preferred form of the printer, the printheads 1052 are high-speed inkjet printheads, and the print engine/controllers 1050 accept compressed page descriptions which they expand and send to the printheads in real time, described further in our earlier application U.S. Ser. No. 09/505,003.

As described above, the printer may have an internal hard disk 1058, typically with multi-gigabyte capacity, for storing documents to be printed as well as rasterized or partially-rasterized pages. Alternatively it may rely on network storage for these purposes. The printer typically accepts documents described using a high-level page description language (PDL) such as Adobe PostScript or Microsoft Windows Metafile which encapsulates Graphics Device Interface (GDI) commands. In this case the processor 1042 rasterizes pages from the PDL to a format suitable for printing. Alternatively or additionally, the printer may accept rasterized or partially-rasterized pages directly.

Figure 5:
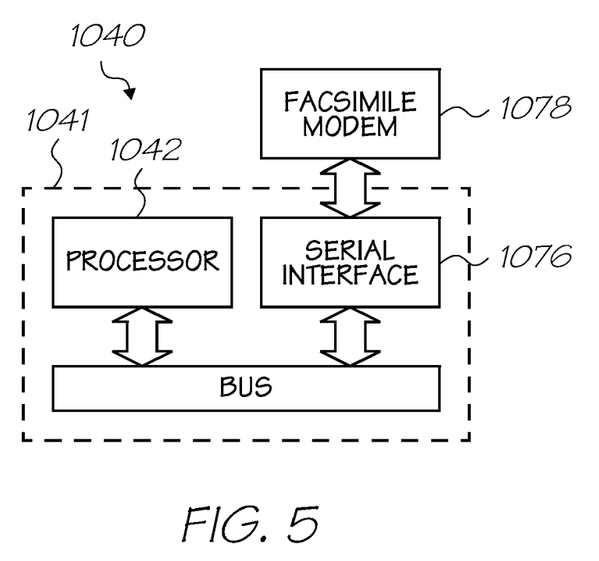
FIG. 5 is a partial block diagram of a printer controller with facsimile modem according to an embodiment of the invention.

A variant of the printer controller, a block diagram of which is shown in FIG. 5, incorporates a facsimile modulator/demodulator (modem) 1078, controlled by the processor 1042 via a serial interface 1076, which allows documents to be transmitted and/or received via facsimile. The advantages of manual collation of multiple source pages in relation to binding apply equally to manual collation in relation to facsimile transmission. The printer's user interface may give the user facsimile control via a dedicated keypad for telephone number entry and a dedicated button for transmission, but preferably provides a facsimile control user interface via the touch-sensitive display.

More generally, the printer may allow the user to specify delivery of a manually collated document to a remote printer connected to a local-area or wide-area network which is addressable by the printer controller via its network interface 1046. The remote printer may be a conventional printer, or it may be a printer with any of the capabilities of the printer of the present invention.

For the purposes of being remotely discoverable and addressable as a printer, the printer of the present invention may implement a protocol such as the Internet Printing Protocol.

Figure 6:
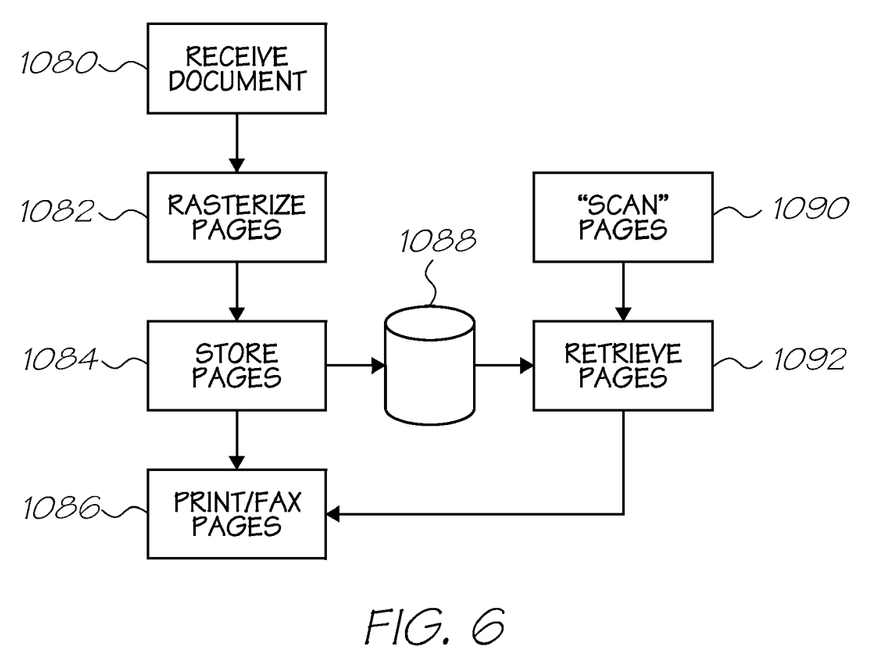
FIG. 6 is a flow diagram of a printing and copying control process.

The control flow of the printer is shown in FIG. 6. During normal printing, the printer receives (at 1080) a document from a host computer, rasterizes (at 1082) the pages of the document, stores (at 1084) the rasterized pages on local or network storage 1088 (e.g. internal hard disk 1058), and finally prints (at 1084) the pages (or transmits them via facsimile). During copying, the printer "scans" (at 1090) the source pages (i.e. senses their codes), retrieves (at 1092) the corresponding electronic versions of the pages, and finally prints or transmits (at 1084) the pages.

CONCLUSION

The present invention has been described with reference to a preferred embodiment and number of specific alternative embodiments. However, it will be appreciated by those skilled in the relevant fields that a number of other embodiments, differing from those specifically described; will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A document copier comprising:
   an input transport mechanism and an output transport mechanism linked via a media path, the mechanisms configured to feed sheets of media through the media path;
   a print engine located in the media path for printing on media fed through the media path;
   a code sensor arranged upstream of the print engine in the media path, said sensor configured to capture images of a sheet surface; and
   a controller for controlling the transport mechanisms, the print engine and code sensor, wherein the controller decodes optical patterns found in the captured images to obtain one or more codes able to identify an electronic source where an electronic copy of the sheet is stored, to retrieve the electronic copy, and to print the electronic copy on a blank sheet of media with the print engine.

2. The document copier of claim 1, which includes a document binding mechanism at an end of the media path for binding printed sheets together.

3. The document copier of claim 2, wherein the binding mechanism includes a glue applicator and a stamping mechanism for stamping glued sheets together.

4. The document copier of claim 1, wherein the input transport mechanism includes an input tray for blank sheets and an input tray for sheets having the optical images encoded thereon.

5. The document copier of claim 1, wherein the print engine includes dual printheads arranged in a duplex printing arrangement.

6. The document copier of claim 1, wherein the code sensor includes a light source, projection and image capture optics, and an image sensor.

7. The document copier of claim 1, wherein the electronic source is selected from a group consisting of a storage medium contained within a host computer, a server which is accessed over a computer network, and a storage medium contained within the copier itself.

* * * * *